US012363329B2

(12) United States Patent
Jiang et al.

(10) Patent No.: US 12,363,329 B2
(45) Date of Patent: Jul. 15, 2025

(54) SUBSTITUTIONAL QUALITY FACTOR LEARNING IN THE LATENT SPACE FOR NEURAL IMAGE COMPRESSION

(71) Applicant: TENCENT AMERICA LLC, Palo Alto, CA (US)

(72) Inventors: Wei Jiang, Palo Alto, CA (US); Wei Wang, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 491 days.

(21) Appl. No.: 17/949,434

(22) Filed: Sep. 21, 2022

(65) Prior Publication Data

US 2023/0122449 A1    Apr. 20, 2023

Related U.S. Application Data

(60) Provisional application No. 63/289,048, filed on Dec. 13, 2021, provisional application No. 63/257,005, filed on Oct. 18, 2021.

(51) Int. Cl.
*H04N 19/42* (2014.01)
*H04N 19/154* (2014.01)
*H04N 19/30* (2014.01)
*H04N 19/463* (2014.01)
*H04N 19/50* (2014.01)

(52) U.S. Cl.
CPC .......... *H04N 19/42* (2014.11); *H04N 19/154* (2014.11); *H04N 19/30* (2014.11); *H04N 19/463* (2014.11); *H04N 19/50* (2014.11)

(58) Field of Classification Search
None
See application file for complete search history.

(56) References Cited

U.S. PATENT DOCUMENTS 11,412,225 B2 * 8/2022 Lee .................. H04N 19/196
2020/0029084 A1   1/2020 Wierstra et al.
(Continued)

OTHER PUBLICATIONS

International Search Report dated Feb. 28, 2023 in Application No. PCT/US22/45002.
(Continued)

*Primary Examiner* — Darryl V Dottin
(74) *Attorney, Agent, or Firm* — Sughrue Mion, PLLC (57) ABSTRACT

Neural image compression using substitutional quality factor learning in a latent space, including receiving a compressed bitstream and a target quality factor indicating a target compression quality, calculating a decoded latent representation of the compressed bitstream, and calculating a reconstructed image based on the decoded latent representation of the compressed bitstream and the target quality factor, computing a shared feature based on a network forward computation using shared decoding parameters (SDP) of one or more layers of a convolutional neural network, computing estimated adaptive decoding parameters (ADP) for the one or more layers of the convolutional neural network based on the shared feature, the adaptive decoding parameters, and the target quality factor, and computing an output tensor based on the estimated ADP in the one or more layers of the convolutional neural network and the shared feature.

20 Claims, 10 Drawing Sheets

(56) References Cited

U.S. PATENT DOCUMENTS

2020/0311982 A1   10/2020  Ogawa
2022/0230362 A1*  7/2022  Jiang .................... H04N 19/115

OTHER PUBLICATIONS

Written Opinion of the International Searching Authority dated Feb. 28, 2023 in Application No. PCT/US22/45002.
Cheng et al., "Highly Scalable Image Reconstruction using Deep Neural Networks with Bandpass Filtering", <URL:https://arxiv.Org/pdf/1805.03300,pdf>, Nov. 26, 2018, pp. 1-9 (9 total pages).
Fei Yang et al., "Variable Rate Deep Image Compression With Modulated Autoencoder", IEEE Signal Processing Letters, 2020, vol. 27, pp. 331-335 (5 pages total).
Communication dated Nov. 19, 2024, issued in Japanese Application No. 2023-547760.

* cited by examiner

SUBSTITUTIONAL QUALITY FACTOR LEARNING IN THE LATENT SPACE FOR NEURAL IMAGE COMPRESSION

CROSS-REFERENCE TO RELATED APPLICATION

This application is based on and claims priority to U.S. Provisional Patent Application No. 63/289,048, filed on Dec. 13, 2021, and U.S. Provisional Patent Application No. 63/257,005, file on Oct. 18, 2021, the disclosure of which is incorporated by reference herein in its entirety.

FIELD

Apparatuses and methods consistent with example embodiments of the present disclosure relate to the substitutional quality factor learning in the latent space for neural image compression.

BACKGROUND

ISO/IEC MPEG (JTC 1/SC 29/WG 11) has been actively searching for potential needs for standardization of future video coding technology, including advanced neural image and video compression methodologies. ISO/IEC JPEG has established the JPEG-AI group focusing on AI-based end-to-end Neural Image Compression (NIC) using Neural Networks (NN).

Although previous approaches have shown promising performance, flexible bitrate control remains a challenging issue for previous NIC methods. Conventionally, it may require training multiple model instances targeting each desired trade-off between a rate and a distortion (a quality of compressed images) individually. All these multiple model instances may be stored and deployed on a decoder side to reconstruct images from different bitrates. Also, these model instances cannot give arbitrary smooth bitrate control, because it is difficult to train and store an infinite number of model instances for every possible target bitrate. Previous approaches have studied multi-rate NIC in which one model instance is trained to achieve compression of multiple pre-defined bitrates. However, arbitrary smooth bitrate control remains an unexplored open issue.

SUMMARY

According to some embodiments, a method may be provided for neural image compression using substitutional quality factor learning in a latent space, the method being performed by at least one processor, the method including receiving a compressed bitstream and a target quality factor indicating a target compression quality; calculating a decoded latent representation of the compressed bitstream; and calculating a reconstructed image based on the decoded latent representation of the compressed bitstream and the target quality factor, wherein calculating the reconstructed image includes computing a shared feature based a network forward computation using shared decoding parameters (SDP) of one or more layers of a convolutional neural network, computing estimated adaptive decoding parameters (ADP) for the one or more layers of the convolutional neural network based on the shared feature, the adaptive decoding parameters, and the target quality factor, and computing an output tensor based on the estimated ADP in the one or more layers of the convolutional neural network and the shared feature.

According to exemplary embodiments, an apparatus may be provided that includes at least one memory configured to store computer program code; and at least one processor configured to access said at least one memory and operate as instructed by said computer program code, said computer program code including receiving code configured to cause at least one processor to receive a compressed bitstream and a target quality factor indicating a target compression quality; first calculating code configured to cause the at least one processor to calculate a decoded latent representation of the compressed bitstream; and second calculating code configured to cause the at least one processor to calculate a reconstructed image based on the decoded latent representation of the compressed bitstream and the target quality factor, wherein the second calculating code is further configured to include first computing code configured to cause the at least one processor to compute a shared feature based on a network forward computation using shared decoding parameters (SDP) of one or more layers of a convolutional neural network, second computing code configured to cause the at least one processor to compute estimated adaptive decoding parameters (ADP) for the one or more layers of the convolutional neural network based on the shared feature, the adaptive decoding parameters, and the target quality factor, and third computing code configured to cause the at least one processor to compute an output tensor based on the estimated ADP in the one or more layers and the shared feature.

According to some embodiments, a non-transitory computer-readable recording medium may be provided having instructions stored thereon, which when executed by at least one processor in a decoder cause the processor to perform a method for neural image compression using substitutional quality factor learning in a latent space, the method including receiving a compressed bitstream and a target quality factor indicating a target compression quality; calculating a decoded latent representation of the compressed bitstream; and calculating a reconstructed image based on the decoded latent representation of the compressed bitstream and the target quality factor, wherein calculating the reconstructed image includes computing a shared feature based on a network forward computation using shared decoding parameters (SDP) of one or more layers of a convolutional neural network, computing estimated adaptive decoding parameters (ADP) for the one or more layers of the convolutional neural network based on the shared feature, the adaptive decoding parameters, and the target quality factor, and computing an output tensor based on the estimated ADP in the one or more layers and the shared feature.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

The disclosure describes methods and apparatuses for a Meta Neural Image Compression (meta-NIC) framework by finding substitutional Quality Factors (QF) in a decoded latent space. A meta learning mechanism may be used to adaptively compute the substitutional quality control parameter for each image on the encoder based on the decoded latent feature of the input image and the target compression quality. The substitutional quality control parameters may be used to improve the computed quality-adaptive weight parameters towards better recovery of the target image when the decoder is reconstructing the image.

Figure 1:
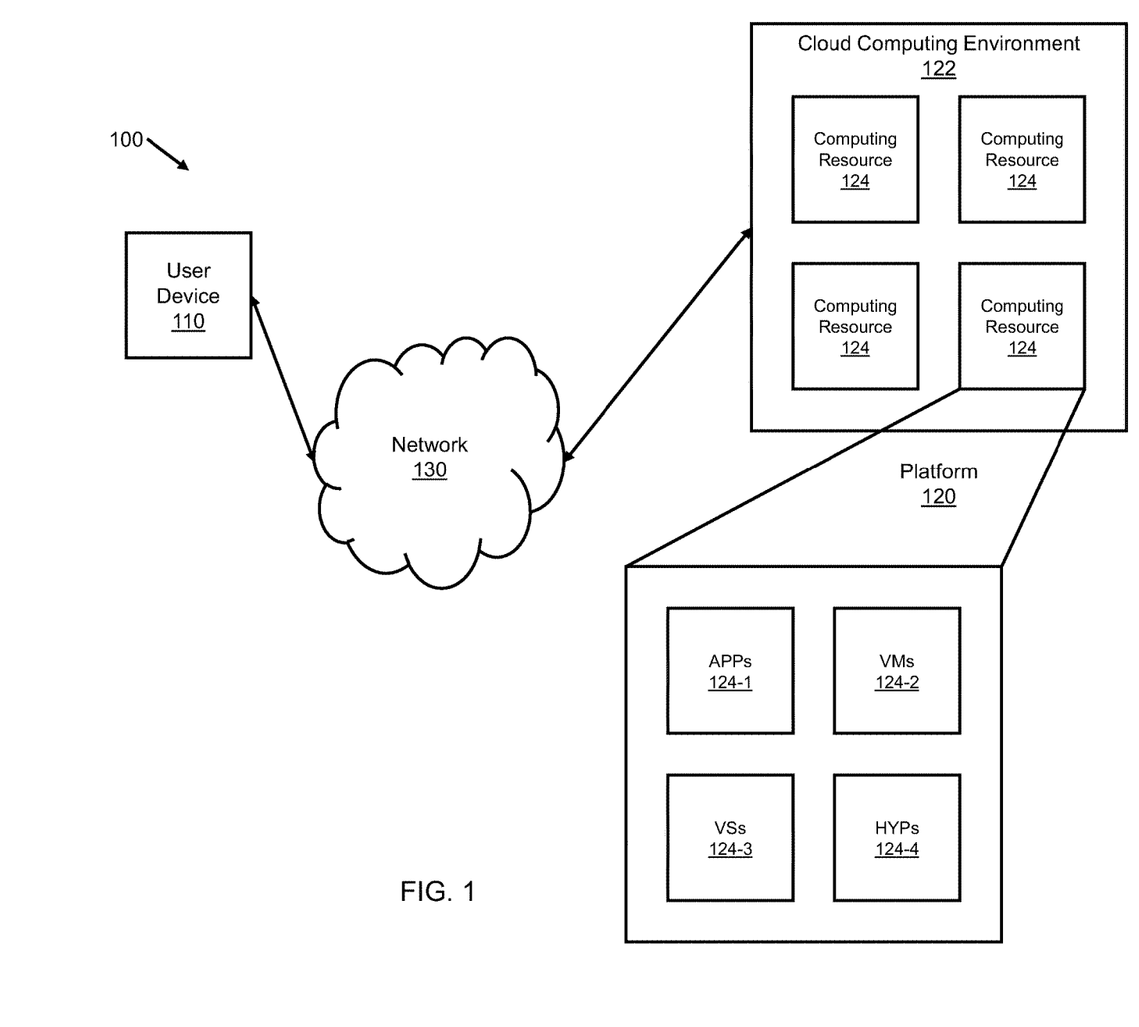
FIG. 1 is a diagram of an example environment in which systems and/or methods, described herein, may be implemented.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more operations described as being performed by another set of devices of the environment 100.

Figure 2:
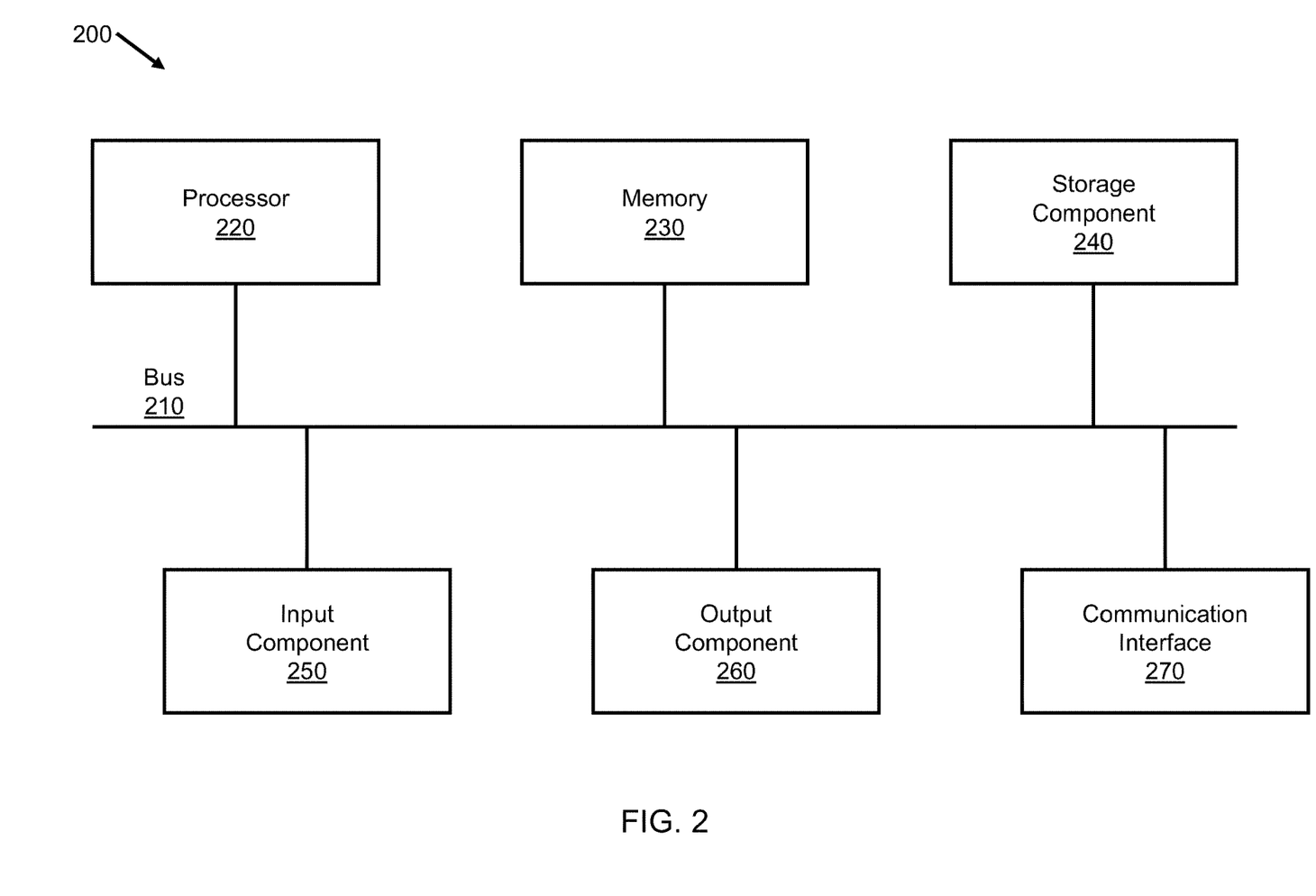
FIG. 2 is a diagram of example components of one or more device of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 may be implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform an operation. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more operations described as being performed by another set of components of the device 200.

The disclosure proposes a meta-NIC framework that supports substitutional QF in a decoded latent space. A meta learning mechanism may be used to adaptively compute the substitutional quality control parameter for each image on the encoder based on the decoded latent feature of the input image and the target compression quality. The substitutional quality control parameters may be used to improve the computed quality-adaptive weight parameters towards better recovery of the target image when the decoder is reconstructing the image.

Given an input image x of size (h,w,c), where h, w, c are a height, a width, and a number of channels, respectively, a target of a test stage of an NIC workflow may be described as follows. The input image x may be a regular image frame (t=1), a 4-dimensional video sequence comprising more than one image frame (t>1), and so on. Each image frame may be a color image (c=3), a gray-scale image (c=1), an rgb+depth image (c=4), etc. A compressed representation $\bar{y}$ that may be compact for storage and transmission may be computed. Then, based on the compressed representation $\bar{y}$, an output image $\bar{x}$ may be reconstructed, and the reconstructed output image $\bar{x}$ may be similar to the original input image x. A distortion loss $D(x,\bar{x})$ may be used to measure a reconstruction error, such as a peak signal-to-noise ratio (PSNR) or a structural similarity index measure (SSIM). A rate loss $R(\bar{y})$ may be computed to measure a bit consumption of the compressed representation $\bar{y}$. A trade-off hyperparameter $\lambda$ may be used to form a joint Rate-Distortion (R-D) loss:

$$L(x,\bar{x},\bar{y})=\lambda D(x,\bar{x})+R(\bar{y}) \quad (1).$$

Training with a large hyperparameter $\lambda$ may result in compression models with smaller distortion but more bit consumption, and vice versa. Traditionally, for each predefined hyperparameter $\lambda$, an NIC model instance will be trained, which will not work well for other values of the hyperparameter $\lambda$. Therefore, to achieve multiple bitrates of a compressed stream, traditional methods may require training and storing multiple model instances. Further, because it may be difficult to train a model for every possible value of the hyperparameter $\lambda$ in practice, traditional methods cannot achieve arbitrary smooth quality control such as arbitrary smooth bitrate control. Additionally, a model instance needs to be trained to optimize the loss measured by each type of metric, (e.g., for each distortion metric, i.e., PSNR, SSIM, a weighted combination of both, or other metrics) and traditional methods cannot achieve smooth quality metric control.

Figure 3A:
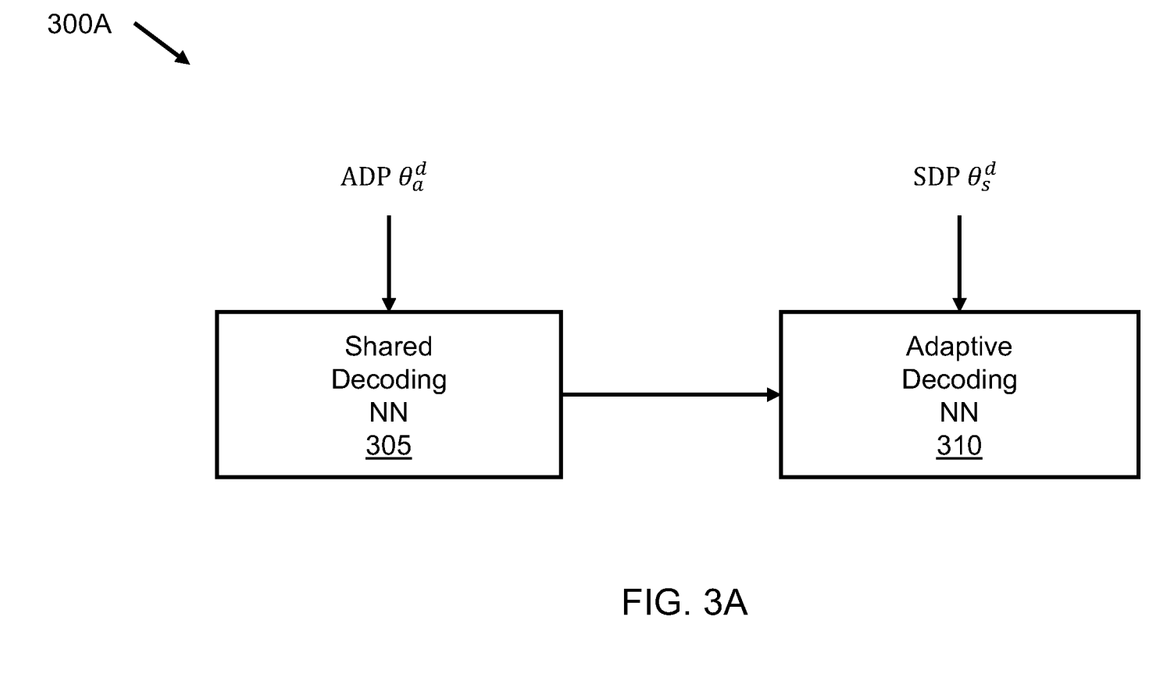
FIGS. 3A and 3B are block diagrams of meta-NIC architectures 300A and 300B for adaptive neural image compression by meta-learning, according to embodiments.
Figure 3B:
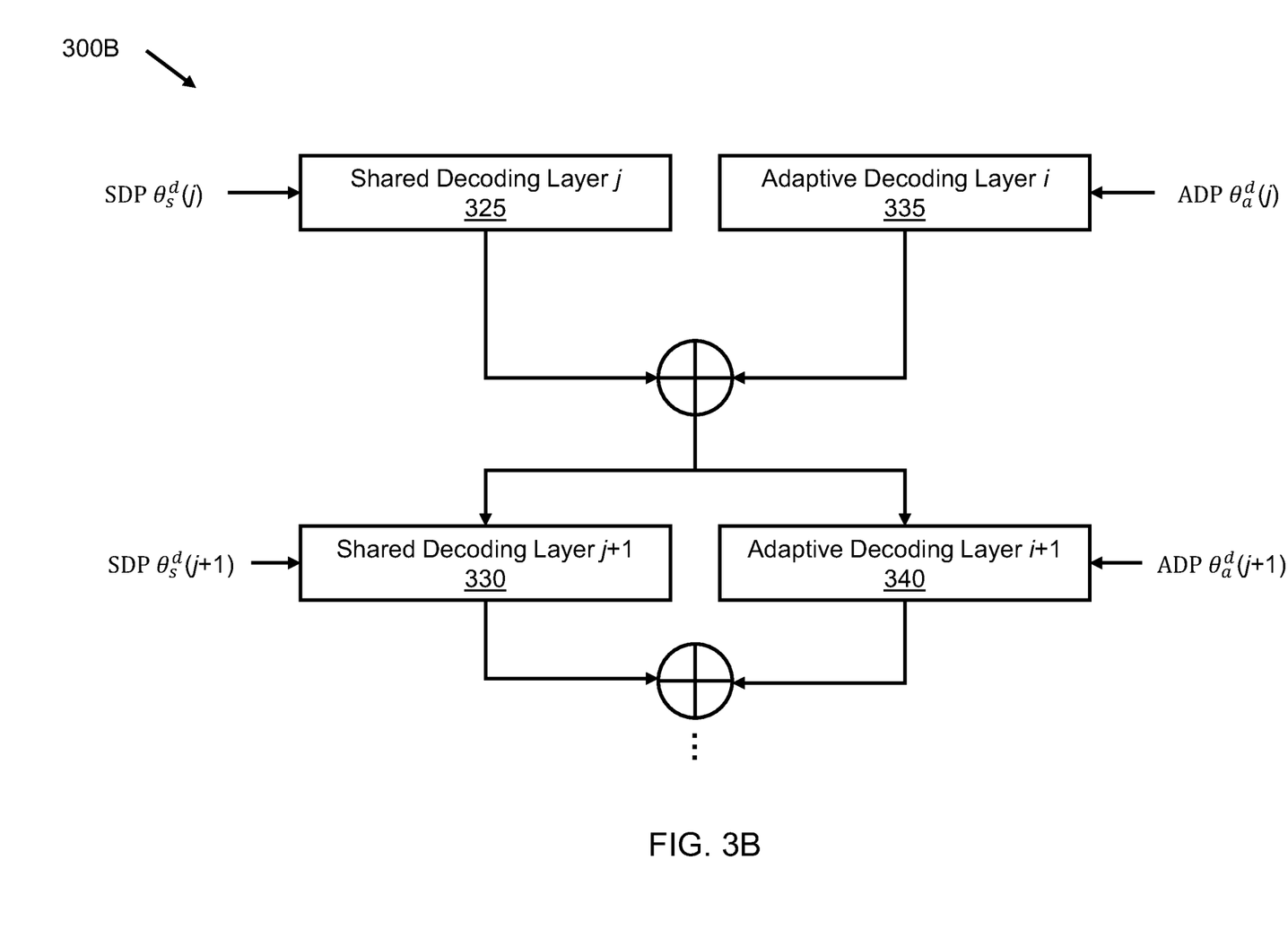

FIGS. 3A and 3B are block diagrams of meta-NIC architectures 300A and 300B for adaptive neural image compression by meta-learning, according to embodiments.

As shown in FIG. 3A, the meta-NIC architecture 300A includes a shared decoding NN 305 and an adaptive decoding NN 310.

As shown in FIG. 3B, the meta-NIC architecture 300B includes shared decoding layers 325 and 330 and adaptive decoding layers 335 and 340.

In this disclosure, model parameters of an underlying NIC encoder and an underlying NIC decoder are separated into two parts $\theta_s^d$ and $\theta_a^d$ denoting Shared Decoding Parameters (SDP) and Adaptive Decoding Parameters (ADP) respectively. FIGS. 3A and 3B show two embodiments of an NIC network architecture.

In FIG. 3A, SDP and ADP are separated individual NN modules, and these individual modules are connected to each other sequentially for network forward computation. Here, FIG. 3A shows a sequential order of connecting these individual NN modules. Other orders may be used as well.

In FIG. 3B, a parameter may be split within NN layers. Let $\theta_s^d(j)$ and $\theta_a^d(j)$ denote SDP and ADP for a j-th layer of an NIC decoder, respectively. The network will compute inference outputs based on corresponding inputs for SDP and ADP, respectively, and these outputs will be combined (e.g., by addition, concatenation, multiplication, etc.) and then sent to a next layer.

The embodiment of FIG. 3A may be seen as a case of FIG. 3B, in which the layers in the shared decoding NN 315 $\theta_s^d(j)$ and in the adaptive decoding NN 320 $\theta_a^d(j)$ are empty. Therefore, in other embodiments, the network structures of FIGS. 3A and 3B may be combined, in which an NIC architecture includes both purely shared encoding/decoding layers and/or purely adaptive encoding/decoding layers, and mixed layers with partial shared encoding/decoding parameters and partial adaptive encoding/decoding parameters.

In some embodiments, the NN structure of the encoder does not have any restrictions. For example, for each image x, a compressed representation $\bar{y}$ may be generated by the NN-based encoder. The compressed representation $\bar{y}$ may then quantized, entropy encoded to generate the bitstream $\bar{y}'$, and then entropy decoded, and dequantized to generate a decoded latent representation $\hat{y}$. In some embodiments, an individual encoder model instance may be used for each desired compression quality. In other embodiments, a meta-NIC encoder similar to the meta-NIC decoder may be used with shared and adaptive encoding parameters.

Figure 4A:
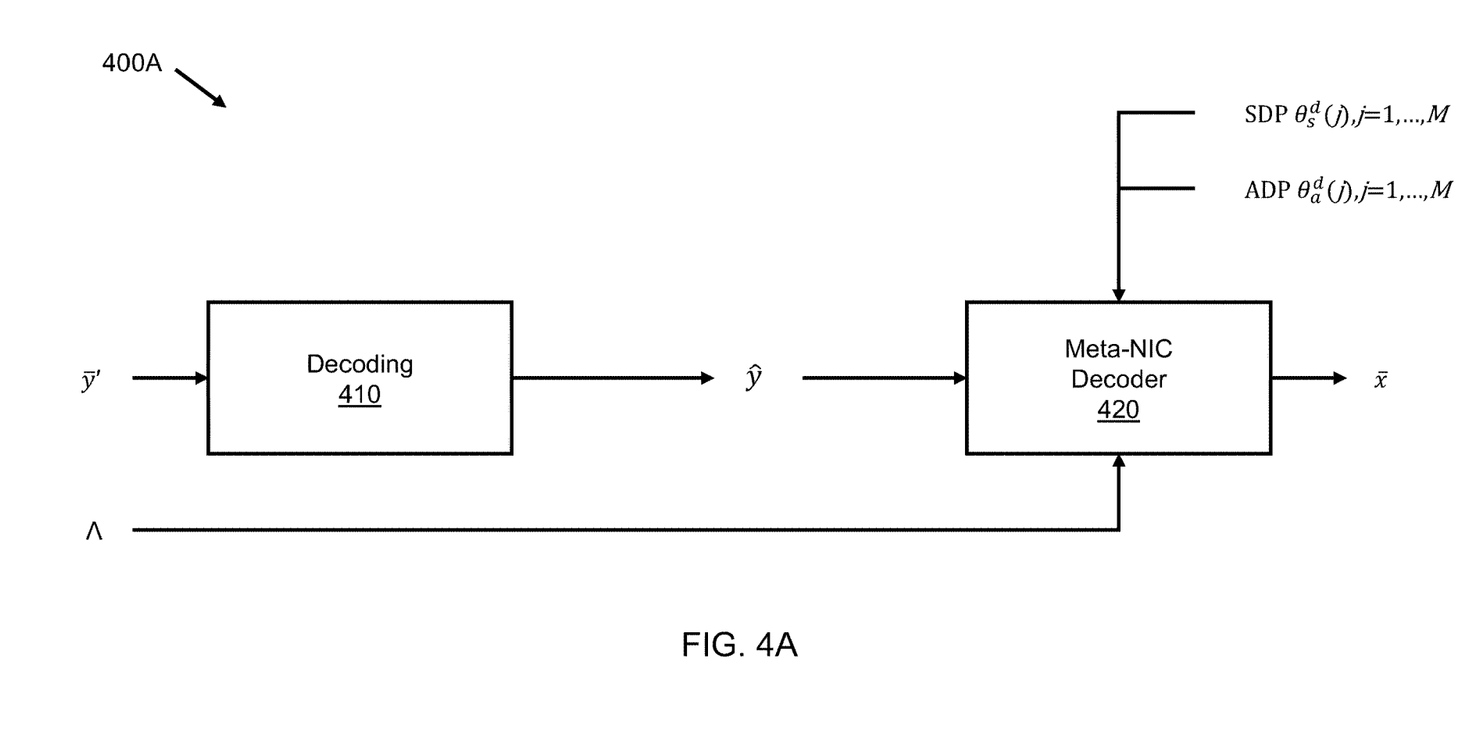
FIGS. 4A and 4B are block diagrams of an apparatus 400 for adaptive neural image compression by meta-learning, during a test stage, according to embodiments.
Figure 4B:
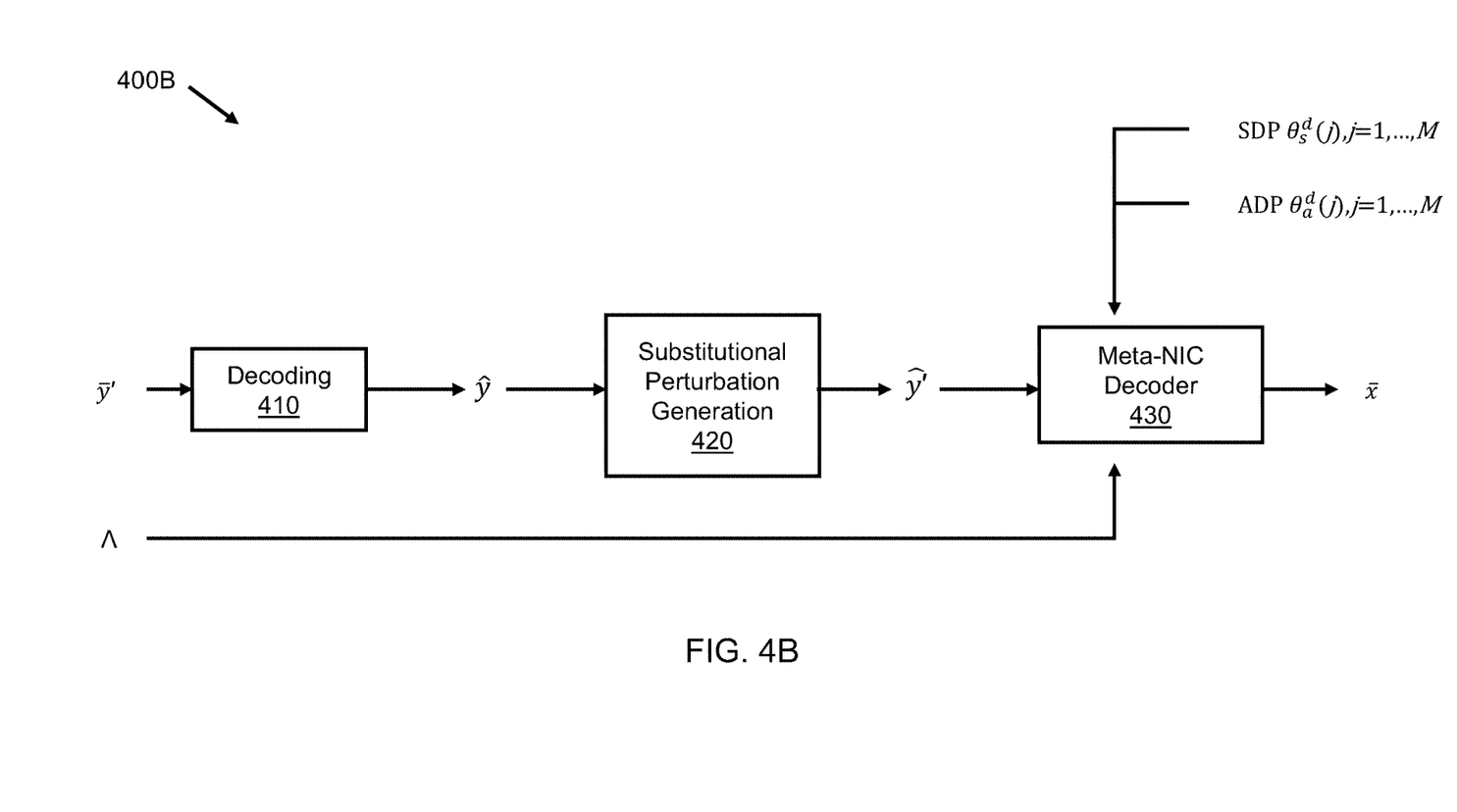

FIGS. 4A and 4B are block diagrams of an apparatus 400 for adaptive neural image compression by meta-learning, during a test stage, according to embodiments. Additionally, FIG. 4C is a block diagram of the inference workflow of the meta-NIC decoder.

As shown in FIG. 4A, the apparatus 400 includes a decoder 410 and a meta-NIC decoder 420.

As shown in FIG. 4B, the meta-NIC architecture 400B includes a decoder 410, a Substitutional Perturbation Generation module 420, and a meta-NIC decoder 430.

Figure 4C:
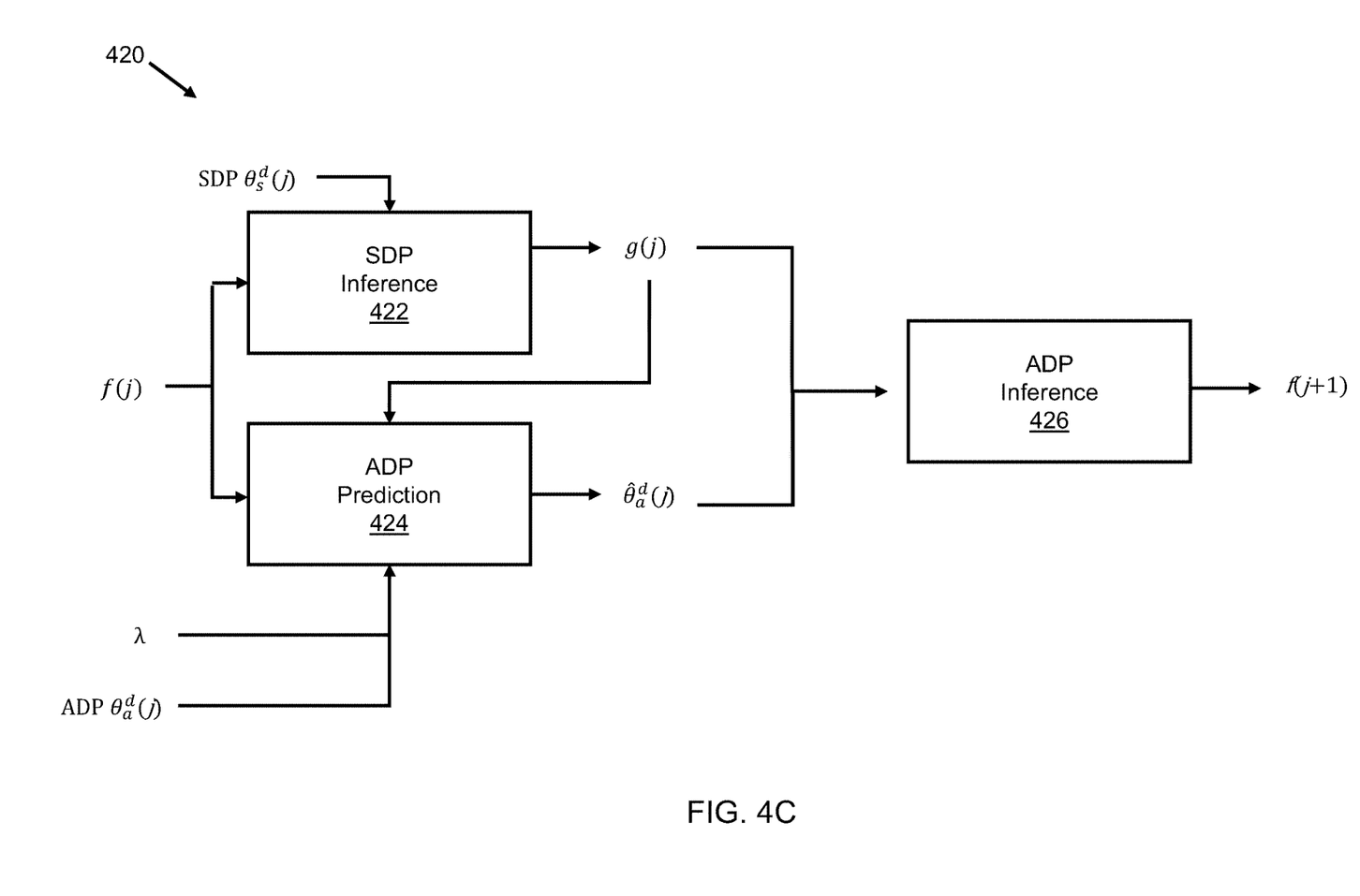
FIG. 4C is a block diagram of the inference workflow of the meta-NIC decoder.

In FIG. 4C, the meta-NIC architecture 400B includes a SDP Inference module 422, a ADP Prediction module 424, and a ADP Inference module 426.

FIG. 4A shows an overall workflow of the decoder in the test stage of a meta-NIC framework. Let $\theta_s^d(j)$ and $\theta_a^d(j)$ denote SDP and ADP for an j-th layer of the meta-NIC decoder 420, respectively. This is an example notation, because for a layer that is completely shared, $\theta_a^d(j)$ is empty. For a layer that is completely adaptive, $\theta_s^d(j)$ is empty. In other words, this notation may be used for both embodiments of FIGS. 3A and 3B.

In FIGS. 4A and 4B, the compressed bitstream $\bar{y}'$ is received, which may be passed through a Decoding module 410 (typically comprising of entropy decoding and dequantization operations) to compute the decoded latent representation $\hat{y}$. At the same time, a target QF $\Lambda$ may be received, which is sent from the encoder indicating the target compression quality of the reconstructed image. More details of the QF $\Lambda$ will be described later in the encoding process. Additionally, in FIG. 4B, a meta-NIC Decoding module 430 computes the reconstructed image $\bar{x}$ based on the latent representation $\hat{y}$ and the target QF $\Lambda$. In the meta-NIC Decoding module 430, $\hat{y}$ may be passed through the meta-NIC Decoding NN. Let f(j) and f(j+1) denote the input and output tensor of the j-th layer.

FIG. 4C gives an embodiment of the inference workflow of the meta-NIC decoder for the j-th layer. Based on f(j) and $\theta_s^d(j)$, an SDP Inference module 422 computes a shared feature g(j) based on a shared inference operation $G_j(f(j), \theta_s^d(j))$ (e.g., the operation may be modeled by the network forward computation using the SDP of the j-th layer). Based on f(j), g(j), $\theta_a^d(j)$ and $\Lambda$, an ADP Prediction module 424 computes an estimated ADP $\hat{\theta}_a^d(j)$ for the j-th layer. The ADP Prediction module 424 may typically be an NN (e.g., with convolution and fully connected layers), which predicts an updated $\hat{\theta}_a^d(j)$ based on the original ADP $\theta_a^d(i)$, the current input, and the target quality indicator $\Lambda$. In the embodiment of FIG. 4C, f(j) may be used as input to the ADP Prediction module 424. In some other embodiments, g(j) may be used instead of f(j). In other embodiments, an SDP loss may be computed based on g (j) and the gradient of the loss may be used as input to the ADP Prediction. Based on the estimated ADP $\hat{\theta}_a^d(j)$ and the shared feature g(j), an ADP Inference module 426 computes the output tensor f(j+1) based on an ADP inference 426 operation $A_j(g(j), \hat{\theta}_a^d(j))$ (e.g., the operation may be modeled by the network forward computation using estimated ADP in the j-th layer).

The workflow described in FIG. 4C is a general notation. For a layer that is completely shared with $\theta_a^d(j)$ being empty, the ADP-related modules and f(j+1)=g(j) are omitted. For a layer that is completely adaptive with $\theta_s^d(j)$ being empty, the SDP-related modules and g(j)=f(j) are omitted.

Assume there are a total of M layers for the meta-NIC decoder, the output of the last layer may result in the reconstructed image $\bar{x}$.

Additionally, in FIG. 4B, the decoded latent $\hat{y}$ may be passed through a Substitutional Perturbation Generation module 420, which computes a substitutional latent $\hat{y}'$ based on latent $\hat{y}$ and the QF $\Lambda$. This substitutional latent $\hat{y}'$ may then be passed into the meta-NIC Decoding module 430 instead of the original $\hat{y}$ to compute the reconstructed image $\bar{x}$.

Figure 5A:
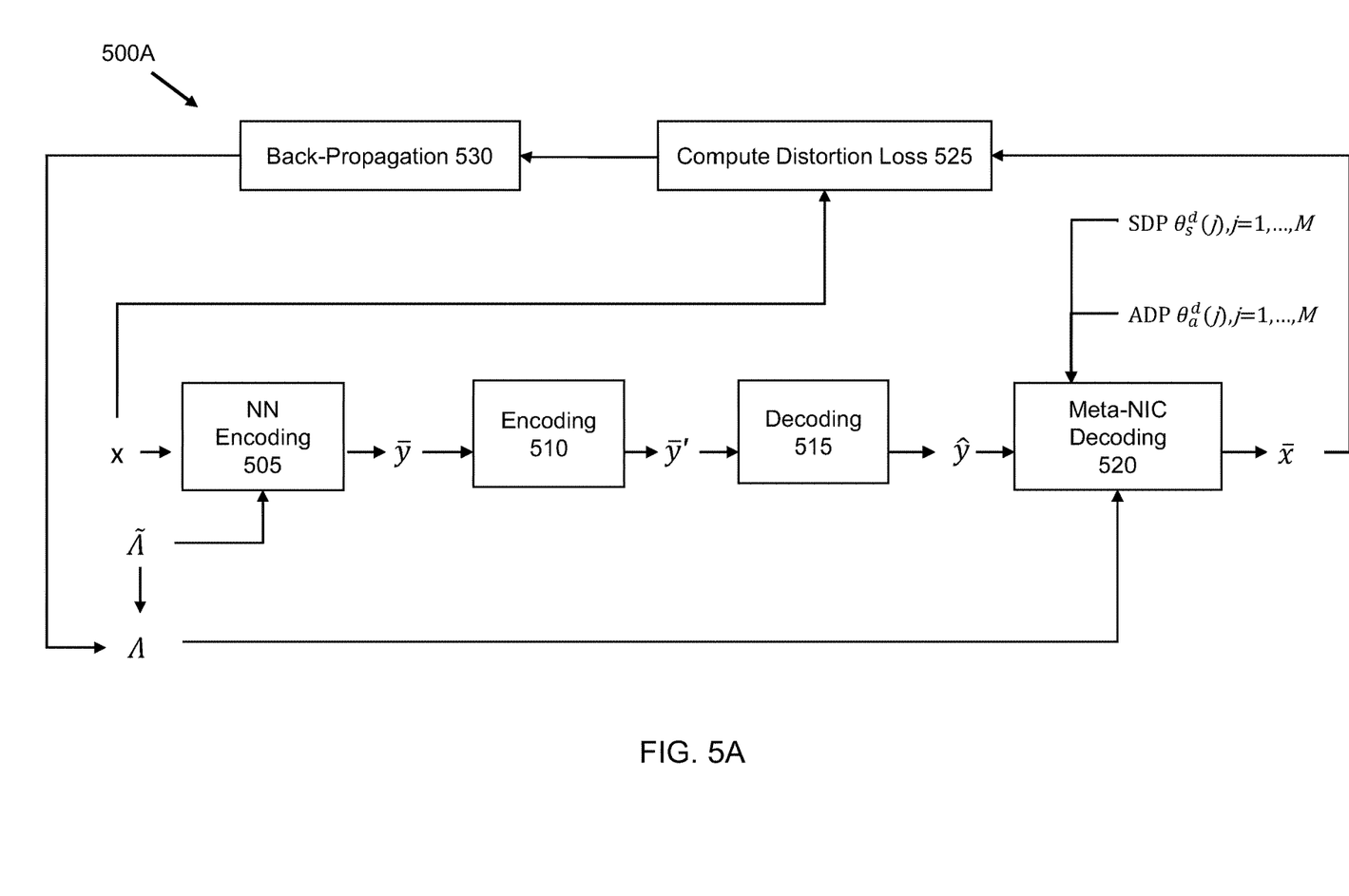
FIGS. 5A and 5B are block diagrams of meta-NIC architectures 500A and 500B for the encoder workflow in the test stage by meta-learning, according to embodiments
Figure 5B:
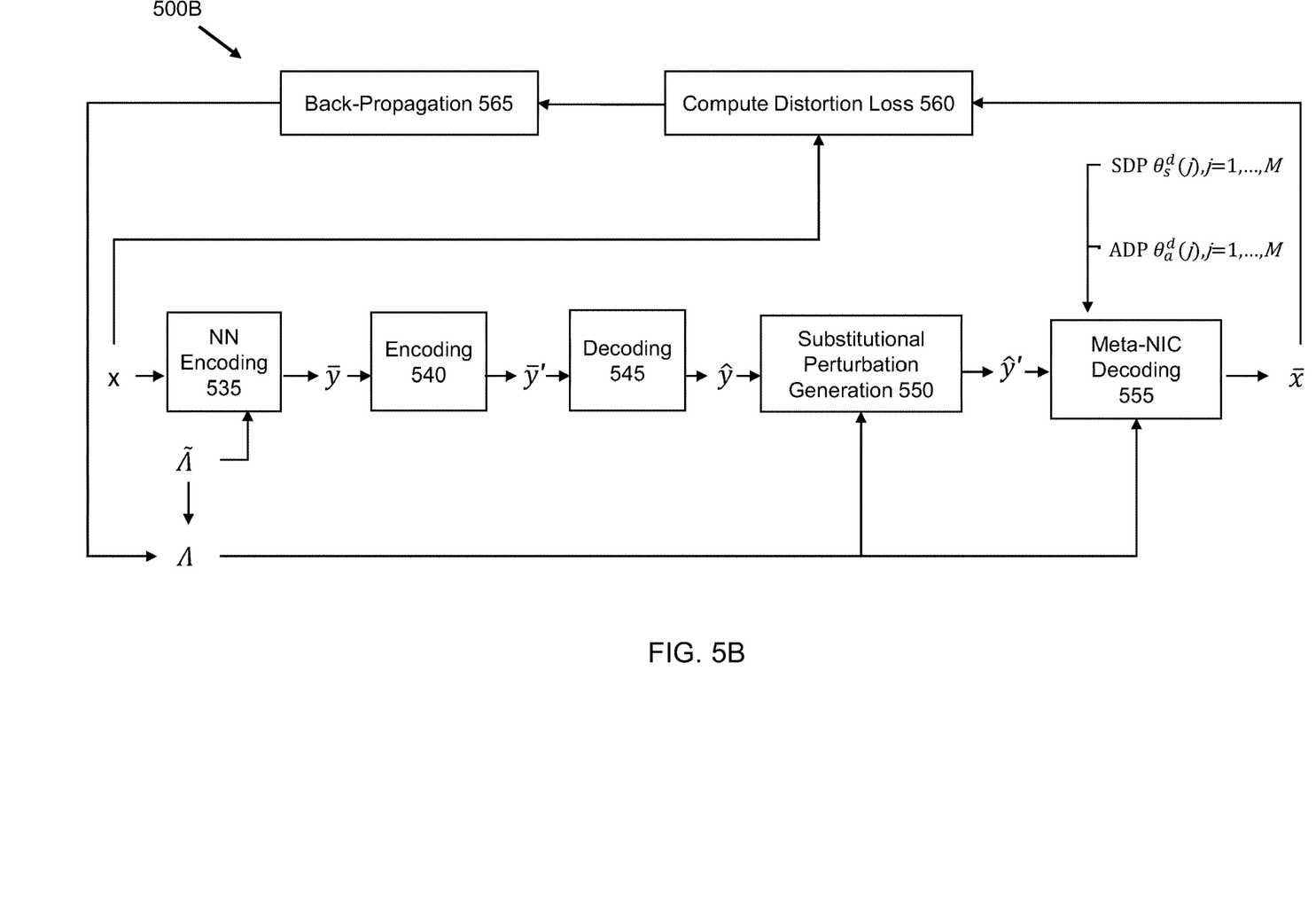

FIGS. 5A and 5B are block diagrams of meta-NIC architectures 500A and 500B for the encoder workflow in the test stage by meta-learning, according to embodiments.

As shown in FIG. 5A, the meta-NIC architecture 500A includes an NN Encoding module 505, an Encoding module, 510, a Decoding module 515, a meta-NIC Decoding module 520, a Compute Distortion Loss module 525, and a Back-Propagation module 530.

As shown in FIG. 5B, the meta-NIC architecture 500B includes an NN Encoding module 535, an Encoding module, 540, a Decoding module 545, a Substitutional Perturbation Generation module 550, a meta-NIC Decoding module 550, a Compute Distortion Loss module 555, and a Back-Propagation module 565.

In FIG. 5A, given an input image x, and given an original target QF $\tilde{\Lambda}$, the NIC encoder 505 may generate the encoded latent $\bar{y}$ and the encoded bitstream. Furthermore, the encoder 510 may compute the decoded latent $\hat{y}$. The original target QF $\tilde{\Lambda}$ indicates the target compression quality, including the target quality metric, the target bitrate, etc. For example, assuming there are a number of q quality metrics $D_1(x,\bar{x})$, ..., $D_q(x,\bar{x})$ in total (e.g., PSNR, SSIM, etc.), the overall quality metric may be generally represented as a weighted combination of them as follows:

$$D(x,\bar{x})=\Sigma_{i=1}^{q} w_i D_i(x,\bar{x}), \quad (2)$$

where weights $w_i \geq 0$. The original target QF $\tilde{\Lambda}$ may be a single vector comprising of all the weights $w_i$ and the target trade-off hyperparameter $\lambda$: $\tilde{\Lambda}=[w_1, \ldots, w_q, \lambda]$.

Next, the decoded latent $\hat{y}$, from the Decoding module 510, may be passed into the meta-NIC Decoding module 520, which operates the same as the meta-NIC Decoding module in the decoder described above. The meta-NIC Decoding 520 module computes the reconstructed image $\bar{x}$ based on $\hat{y}$ and the target QF $\Lambda$. The initial $\Lambda$ may be simply set to be the same as the original target QF $\tilde{\Lambda}$. Then the reconstruction loss (e.g., MSE or MSSSIM) between the original input x and the reconstructed $\bar{x}$ may be computed in the Compute Distortion Loss module 525. Then the gradient of the loss may be computed and back-propagated by the Back-Propagation module 530 to update the target QF $\Lambda$. Based on the updated target QF $\Lambda$ and the decoded latent $\hat{y}$, the meta-NIC Decoding module 520 may compute the updated reconstructed image $\bar{x}$. The system may go through several such iterations, and finally obtain the updated target QF $\Lambda$, which may be sent together with the compressed bitstream $\bar{y}'$ to the decoder side.

In some embodiments, the updated target QF $\Lambda$ may further go through encoding processes like quantization and entropy encoding to further reduce the transmission overhead.

In FIG. 5B, the decoded latent $\hat{y}$, from the Decoding module 545, may be passed through the Substitutional Perturbation Generation module 550 that is the same as the decoder side, which computes a substitutional latent $\hat{y}'$ based on latent $\hat{y}$ and the QF $\Lambda$. This substitutional latent $\hat{y}'$ may then be passed into the meta-NIC Decoding module 555 instead of the original $\hat{y}$ to compute the reconstructed image $\bar{x}$.

The proposed meta-NIC framework allows arbitrary smooth QF $\Lambda$ on the decoder side for reconstruction. In other words, the processing workflow described above will compute the compressed representation and the reconstructed image to fit the arbitrary smooth target QF $\Lambda$.

According to some embodiments, a training process may be implemented and aims at learning the meta-NIC encoder, the SDP $\theta_s^d(j)$ and ADP $\theta_a^d(j)$, $j=1, \ldots$, M for the meta-NIC decoder, the ADP Prediction NN (model parameters denoted as $\Phi^d$), as well as the parameters for the Substitutional Perturbation Generation module (e.g., see FIGS. 4B and 5B).

The meta-NIC encoder and meta-NIC decoder may be trained in an end-to-end fashion through a Model-Agnostic Meta-Learning (MAML) mechanism. Once the underlying meta-NIC encoder and decoder are trained, the Substitutional Perturbation Generation module may be trained by fixing the meta-NIC encoder and decoder parameters while minimizing a fitting loss to compute a substitutional latent representation $\hat{y}'$ from the decoded latent $\hat{y}$, where the substitutional latent representation $\hat{y}'$ are better than the original decoded latent $\hat{y}$ measured by some metrics (e.g., may generate reconstructed image better than the original decoded latent $\hat{y}$ the meta-NIC Decoding module with less distortion or better perceptive quality).

Figure 6:
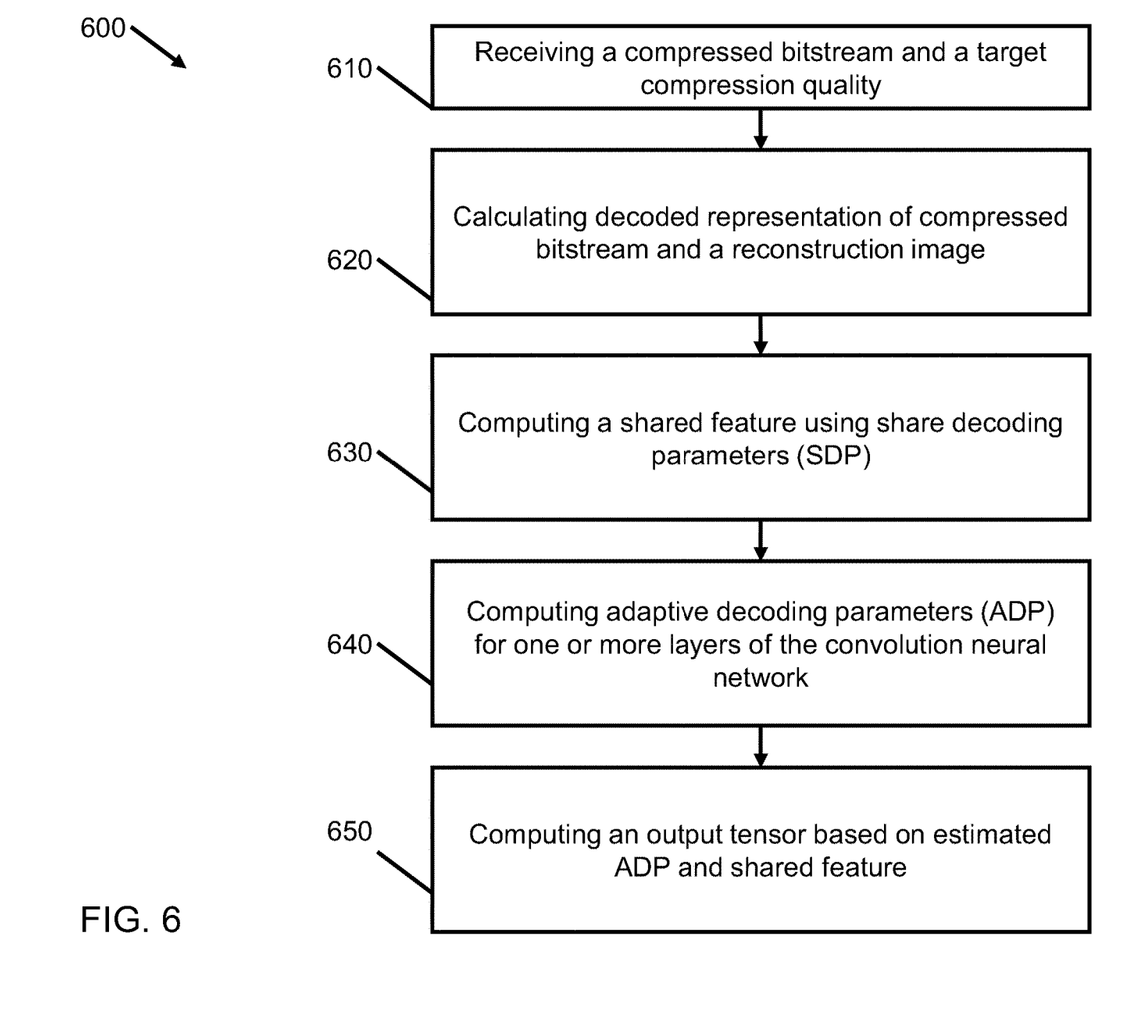
FIG. 6 is a flowchart of method for neural image compression using substitutional quality factor learning in a latent space.

FIG. 6 is a flowchart of an embodiments of a process 600 for neural image compression using substitutional quality factor learning in a latent space.

As shown in FIG. 6, at operation 610 of process 600, a compressed bitstream and a target compression quality are received. The process proceeds to operation 620, where a decoded latent representation of the compressed bitstream is calculated, as shown in FIGS. 4A and 4B. That is, the decoded latent representation may be used to calculate the reconstructed image.

The process proceeds to operation 630, where a shared feature may be computed based on the SDP. The process proceeds to operation 640, where the ADP is computed for the one or more layers of the convolution neural network, as shown in FIG. 4C. As such, an output tensor may be computed based the estimated ADP and the shared feature.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

What is claimed is:

1. A method for neural image compression performed by at least one processor and comprising:
   receiving a compressed bitstream and a target quality factor indicating a target compression quality;
   calculating a decoded latent representation of the compressed bitstream; and
   calculating a reconstructed image based on the decoded latent representation of the compressed bitstream and the target quality factor, wherein calculating the reconstructed image includes:
   (i) computing a shared feature based on a network forward computation using shared decoding parameters (SDP) of one or more layers of a convolutional neural network,
   (ii) computing estimated adaptive decoding parameters (ADP) for the one or more layers of the convolutional neural network based on the shared feature, the adaptive decoding parameters, and the target quality factor, and
   (iii) computing an output tensor based on the estimated ADP in the one or more layers of the convolutional neural network and the shared feature.

2. The method of claim 1, wherein computing the estimated ADP is performed by an ADP prediction module that predicts an updated ADP based on an original ADP, a current input, and the target quality indicator.

3. The method of claim 1, further comprising:
   computing a reconstruction loss between an original input image and the reconstructed image;
   updating the target quality factor based on the computed reconstruction loss; and
   updating the reconstruction image based on the updated target quality factor and the decoded representation of the compressed bitstream.

4. The method of claim 1, further comprising computing a substitutional latent representation of the compressed bitstream based on the decoded latent representation of the bitstream and the target quality factor.

5. The method of claim 4, further comprising computing the reconstructed image and updating the target quality factor based on the substitutional latent representation.

6. The method of claim 5, wherein the reconstruction loss is minimized in response to a determination the substitutional latent representation is computed based on substitutional perturbation generation.

7. The method of claim 6, wherein the reconstructed image is generated with less distortion and a higher perceptive quality than an original image.

8. An apparatus comprising:
   at least one memory configured to store computer program code; and
   at least one processor configured to access said at least one memory and operate as instructed by said computer program code, said computer program code including:
   receiving code configured to cause the at least one processor to receive a compressed bitstream and a target quality factor indicating a target compression quality;
   first calculating code configured to cause the at least one processor to calculate a decoded latent representation of the compressed bitstream; and
   second calculating code configured to cause the at least one processor to calculate a reconstructed image based on the decoded latent representation of the compressed bitstream and the target quality factor, the second calculating code including:
   (i) first computing code configured to cause the at least one processor to compute a shared feature based on a network forward computation using shared decoding parameters (SDP) of one or more layers of a convolutional neural network,
   (ii) second computing code configured to cause the at least one processor to compute estimated adaptive decoding parameters (ADP) for the one or more layers of the convolutional neural network based on the shared feature, the adaptive decoding parameters, and the target quality factor, and
   (iii) third computing code configured to cause the at least one processor to compute an output tensor based on the estimated ADP in the one or more layers and the shared feature.

9. The apparatus of claim 8, wherein said computer program code further includes fourth computing code configured to cause the at least one processor to compute the estimated ADP performed by an ADP prediction module that predicts an updated ADP based on an original ADP, a current input, and the target quality indicator.

10. The apparatus of claim 8, wherein said computer program code further includes fifth computing code configured to cause the at least one processor to:
    compute a reconstruction loss between an original input image and the reconstructed image;
    update the target quality factor based on the computer reconstruction loss; and
    update the reconstruction image based on the updated target quality factor and the decoded representation of the compressed bitstream.

11. The apparatus of claim 8, wherein said computer program code further includes sixth computing code configured to cause the at least one processor to compute a substitutional latent representation of the compressed bitstream based on the decoded latent representation of the bitstream and the target quality factor.

12. The apparatus of claim 11, wherein said sixth computing code is further configured to cause the at least one processor to compute the reconstructed image and update the target quality factor based on the substitutional latent representation.

13. The apparatus of claim 12, wherein the reconstruction loss is minimized when the substitutional latent representation is computed based on substitutional perturbation generation, and the reconstructed image may be generated with less distortion and a higher perceptive quality than an original image.

14. A non-transitory computer-readable recording medium having instructions stored thereon, which when executed by at least one processor causes the processor to:
    receive a compressed bitstream and a target quality factor indicating a target compression quality;
    calculate a decoded latent representation of the compressed bitstream; and
    calculate a reconstructed image based on the decoded latent representation of the compressed bitstream and the target quality factor, including:
      (i) computing a shared feature based on a network forward computation using shared decoding parameters (SDP) of one or more layers of a convolutional neural network,
      (ii) computing estimated adaptive decoding parameters (ADP) for the one or more layers of the convolutional neural network based on the shared feature, the adaptive decoding parameters, and the target quality factor, and
      (iii) computing an output tensor based on the estimated ADP in the one or more layers and the shared feature.

15. The non-transitory computer-readable recording medium of claim 14, wherein computing the estimated ADP is performed by an ADP prediction module that predicts an updated ADP based on an original ADP, a current input, and the target quality indicator.

16. The non-transitory computer-readable recording medium of claim 14, wherein the instructions further cause the at least one processor to:
    compute a reconstruction loss between an original input image and the reconstructed image;
    update the target quality factor based on the computer reconstruction loss; and
    update the reconstruction image based on the updated target quality factor and the decoded representation of the compressed bitstream.

17. The non-transitory computer-readable recording medium of claim 14, wherein the instructions cause the at least one processor to compute a substitutional latent representation of the compressed bitstream based on the decoded latent representation of the bitstream and the target quality factor.

18. The non-transitory computer-readable recording medium of claim 17, wherein the instructions cause the at least one processor to compute the reconstructed image and updating the target quality factor based on the substitutional latent representation.

19. The non-transitory computer-readable recording medium of claim 18, wherein the reconstruction loss is minimized when the substitutional latent representation is computed based on substitutional perturbation generation.

20. The non-transitory computer-readable recording medium of claim 19, wherein the reconstructed image may be generated with less distortion and a higher perceptive quality than an original image.

* * * * *